United States Patent [11] 3,596,927

[72] Inventors Willard N. Mitchell
 Baytown;
 Armand M. Souby, Baytown; Arthur B. Simmons, III, Houston, all of, Tex.
[21] Appl. No. 865,523
[22] Filed Oct. 10, 1969
[45] Patented Aug. 3, 1971
[73] Assignee Esso Research and Engineering Company
 Continuation-in-part of application Ser. No. 693,728, Dec. 27, 1967, now abandoned.

[54] PRODUCTION OF 4-METHYLPENTENE-1
 8 Claims, No Drawings
[52] U.S. Cl. .................................................. 260/683.2
[51] Int. Cl. .................................................. C07c 5/24
[50] Field of Search .......................................... 260/683.2

[56] References Cited
 UNITED STATES PATENTS
 3,201,493  8/1965  Meisinger et al. ..........  260/683.2
 3,204,009  8/1965  Keith ...........................  260/683.2
 3,240,838  3/1966  White et al. ................  260/683.2

Primary Examiner—Delbert E. Gantz
Assistant Examiner—Veronica O'Keefe
Attorneys—Thomas B. McCulloch, Timothy L. Burgess, Melvin F. Fincke, John S. Schneider, Sylvester W. Brock, Jr. and Kurt S. Meyers ABSTRACT: The production of 4-methylpentene-1 in increased yields is accomplished by the short-time (e.g., 0.1 to 10 seconds) contacting of 4-methylpentene-2 at elevated temperatures (e.g., 600 to 1200° F.) with a suitable isomerization catalyst (e.g., 0.5 to 1.5 percent KOH on alcoholate alumina). Yields as high as seven times greater than thermodynamic equilibrium amounts of 4-methylpentene-1 have been obtained.

PRODUCTION OF 4-METHYLPENTENE-1

CROSS-REFERENCE TO RELATED APPLICATION

This application is a continuation-in-part of our copending application Ser. No. 693,728, filed Dec. 27, 1967, and entitled "Isomerization of 2-Olefins," now abandoned.

BACKGROUND OF THE INVENTION

1. Field of the Invention

This invention pertains to the selective isomerization of methylpentenes to obtain a desired 4-methylpentene-1 product.

2. Description of the Prior Art

As far as is known, there is no successful process now available which provides selective isomerization of methylpentenes into 4-methylpentene-1 although there is some published data which shows sulfuric acid at low temperatures will isomerize various olefins. Such low-temperature, liquid catalyst processes, however, are not as economically attractive as the vapor phase, solid catalyst system of the present invention.

SUMMARY OF THE INVENTION

The present invention is directed to the selective isomerization of a methylpentene to produce increased yields of 4-methylpentene-1. The production of 4-methylpentene-1 is not favored thermodynamically, since it is present at equilibrium conditions only in small quantities. However, 4-methylpentene-1 is a desired product, since it is useful as a monomer in producing a rubberlike product by the process disclosed in U.S. Pat. No. 3,299,022. Thus, it is desirable to provide a process whereby the yield of 4-methylpentene-1 in an isomerization reaction can be maximized.

As shown below in table I, the product distribution at thermodynamic equilibrium is unfavorable from the standpoint of 4-methylpentene-1.

TABLE I

Products at Equilibrium

| Temperature | 800° F. | 850° F. | 900° F | 950° F. |
| --- | --- | --- | --- | --- |
| 2-MP-1 | 34.1 | 34.9 | 35.3 | 35.6 |
| 2-MP-2 | 43.7 | 42.3 | 41.2 | 40.3 |
| 4-MP-2 | 20.4 | 21.4 | 20.9 | 21.9 |
| 4-MP-1 | 1.8 | 1.9 | 2.1 | 2.2 |

Note: "MP" is shorthand for 37 methylpentene."

The present invention is based upon the use of a nonacidic catalyst and short residence times, whereby the production of 4-methylpentene-1 is increased. Each factor in the present process is discussed separately below.

OPERATING CONDITIONS

The feedstock (4-methylpentene-2) is contacted with a bed of suitable catalyst under suitable conditions of temperature, pressure and residence time. Generally, the variables will be as stated below in table II.

TABLE II

Operating Conditions

| Variable | Minimum | Maximum | Preferred |
| --- | --- | --- | --- |
| Temperature | 600° F. | 1,200° F. | 800—950° F. |
| Pressure | 0.1 atm. | 10 atm. | 1 atm. |
| Vapor Residence time | 0.1 second | 10 seconds | 3—5 seconds |

As seen in the examples (infra), particularly good results are obtained with a catalyst consisting of 1.5 weight percent KOH on alcoholate alumina when operating at atmospheric pressure and a temperature of 850° F.

The contact time is critical. As hereinafter discussed, the "disequilibrium" existing in the first stages of the isomerization reaction favoring the production of 4-methylpentene-1 must be preserved by terminating the isomerization reactions before the shift toward equilibrium has advanced too far. Thus, a reaction time of 0.1 to 10 seconds, preferably 3 to 5 seconds, must be employed. This contact time is controlled by the rate at which the feedstock is passed over the catalyst; at higher rates, the contact time is decreased (and vice versa). 4

In general, the shorter residence times will be employed with the higher temperatures, while longer residence times will be used at the lower temperatures. The pressure to be employed is not critical, so long as the methylpentenes are in the vapor phase under the combination of temperature and pressure which is employed. Preferably, a recycle stream of unreacted 4-methylpentene-2 will be employed to increase overall efficiency of this process.

FEEDSTOCK

The feedstock to the present invention is 4-methylpentene-2. Neither of the 2-methylpentenes is suitable as a feedstock, as shown infra in table III. While applicants do not wish to be held to the following explanation, it is believed that the choice of feedstock is dictated by the isomerization reactions which are taking place.

As seen above in table I, the methylpentenes at thermal equilibrium have a distribution which greatly disfavors 4-methylpentene-1, only about 2 percent thereof being present at thermal equilibrium over the temperature range of 800° F. to 950° F. The various equilibria which are involved between the isomers is represented by the following equations (hydrogen atoms being omitted for clarity);

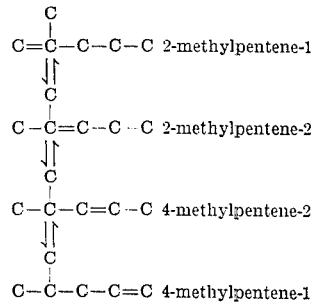

It is believed that initially, while the 4-methylpentene-2 feedstock is isomerizing to 2-methylpentene-2 and 4-methylpentene-1, very little 2-methylpentene-1 is formed. This in effect allows the 2-methylpentene-2 concentration to remain higher than it would be if the 2-methylpentene-2 had reached equilibrium with 2-methylpentene-1. Since the 2-methylpentene-2 concentration is higher, the quantity of 4-methylpentene-2 feedstock which is in "disequilibrium" with 2-methylpentene-2 is also higher. Since the 4-methylpentene-2 is also in "disequilibrium" with 4-methylpentene-1, the quantity of 4-methylpentene-1 will also be higher, initially, than it will be as the isomers approach equilibrium. Thus, by using 4-methylpentene-2 as the feedstock and by using very short residence times, the initial "disequilibrium" can be captured and a proportionally greater amount of 4-methylpentene-1 produced.

The choice of feedstock is critical. In order to obtain the proper "disequilibrium," the isomer (4-methylpentene-2) which is next to the desired product (4-methylpentene-1) must be chosen as the feedstock or the necessary initial "excess" quantities of 4-methylpentene-2 cannot be obtained. This is seen in table III below, wherein are compared the product distribution at thermal equilibrium, short contact time with 2-methylpentene-1 feedstock, short contact time with 2-methylpentene-2 feedstock, and short contact time with 4-methylpentene-2 feedstock.

TABLE III
Comparison of Feedstocks

| Feedstock | Temp., °F. | Contact time, sec. | Product (mol percent) | | | |
|---|---|---|---|---|---|---|
| | | | 2-MP-1 | 2-MP-2 | 4-MP-2 | 4-MP-1 |
| (Equilibrium) | 850 | | 34.9 | 42.3 | 20.9 | 1.9 |
| 2-MP-1 | 850 | 3.3 | (35.9) | 56.7 | 5.6 | 1.8 |
| 2-MP-2 | 850 | 3.3 | 26.1 | (63.7) | 8.2 | 2.0 |
| 4-MP-2 | 850 | 3.3 | 8.3 | 20.7 | (57.4) | 13.6 |

NOTE: Feedstock is shown by parentheses in product analysis. "MP" is shorthand for "methylpentene."

Note that the use of 4-methylpentene-2 as a feedstock coupled with the short contact time, produced a sevenfold increase in the yield of the desired 4-methylpentene-1.

CATALYST

It is believed that any nonacidic isomerization catalyst can be employed in the process of the present invention. Exemplary catalysts are nonacidic aluminas such as activated alumina, alcoholate alumina, and similar aluminas, having an alkaline hydroxide such as KOH, LiOH, NaOH, etc., deposited thereon. A particularly suitable catalyst is KOH on alcoholate alumina (e.g., prepared as in Example 1), containing from about 0.5 weight percent to about 1.5 weight percent KOH (based on the weight of the alcoholate alumina). The KOH deactivates the alcoholate alumina to some extent, but improves its selectivity toward 4-methylpentene-1 production under the conditions employed in the present invention.

The catalyst can be in the form of pellets, extrudates, prills, granules or other shapes, all as is well known in the art, with a suitable size range of one-sixteenth to one-half inch in diameter (preferably one-eighth to one-fourth inch). The catalyst is preferably maintained in the reaction zone as a stationary bed.

DESCRIPTION OF PREFERRED EMBODIMENT

In a preferred embodiment, 4-methylpentene-2 is isomerized by passing a vaporous stream of 4-methylpentene-2 (heated to a temperature of about 800—850° F.) in contact with a bed of catalyst (1.5 weight percent potassium hydroxide on alcoholate alumina), at a space velocity of equivalent to about 0.65 liquid volumes of 4-methylpentene-2 per volume of catalyst per hour. The residence time calculated for the vaporous material is about 3 seconds to about 5 seconds. The inlet pressure into the isomerization zone should be slightly above atmospheric pressure, e.g., about 10 p.s.i.g.

After contact with the bed of catalyst, the vaporous effluent is fractionated to recover a 4-methylpentene-2 stream for recycle into the isomerization zone, a 2-methylpentenes side stream, and a 4-methylpentene-1 product stream. Thus, the advantages of the present invention can be taken advantage of, yielding 38.5 percent selectivity to 4-methylpentene-1, while the relatively low conversion per pass (29.6 percent) can be offset by a recycle rate of about 3:1.

EXAMPLES

Example 1

Manufacture of Catalyst

The catalyst was prepared in the laboratory by contacting a granular alcoholate alumina (particle size range from about one-eighth inch to about one-fourth inch in diameter) with an aqueous solution of potassium hydroxide. An aqueous solution containing 0.67 gram of KOH per 100 grams of $H_2O$ was uniformly contacted with the alcoholate alumina. Sufficient KOH solution was used to obtain the desired loading of KOH on the alumina. After good contacting had been obtained, the impregnated alumina was dried in an oven for 24 hours at 250° F. Following the drying step the temperature was increased to 1,100° F., and the catalyst was calcined for 4 hours to yield a catalyst containing 1.5 weight percent KOH based on the weight of the alcoholate alumina.

Example 2

Isomerization of 4-methylpentene-2

A ⅜-inch i.d. stainless steel tube was packed with 1.5 cc. of a catalyst prepared as in Example 1. A vaporous stream of 4-methylpentene-2 (99 percent purity) was heated to the desired temperature and passed through the packed tube at a rate corresponding to 1 cc./hr. of liquid methylpentene. Although the actual residence time varied slightly, due to the different temperatures, the vapor was in contact with the catalyst for about 3 to 3½ seconds. After an initial line-out period, the effluent from the tube was sampled and analyzed by gas chromatography.

Four runs were made, one each at 800° F., 850° F., 900° F. and 950° F. The pressure was atmospheric in each case. Data from the runs are shown below in table IV.

TABLE IV

Experimental Data, Example 2

| Operating Conditions | Run 1 | Run 2 | Run 3 | Run 4 |
|---|---|---|---|---|
| Temperature, °F | 800 | 850 | 900 | 950 |
| Pressure, p.s.i.a. | 14.7 | 14.7 | 14.7 | 14.7 |
| Residence time, seconds | 3.5 | 3.3 | 3.2 | 3.1 |
| Effluent Analysis, Mol % | | | | |
| 4-Methylpentene-1 | 11.4 | 13.6 | 12.5 | 11.6 |
| 4-Methylpentene-2 | 70.4 | 57.4 | 48.7 | 36.4 |
| 2-Methylpentene-2 | 13.4 | 20.7 | 26.6 | 35.6 |
| 2-Methylpentene-1 | 4.8 | 8.3 | 12.1 | 16.4 |
| Conversion | 29.6% | 42.6% | 51.3% | 63.6% |
| Selectivity | 38.5% | 32.0% | 24.4% | 18.3% |

Examples 3 and 4

The isomerization reaction of Example 2 was repeated at 850° F., using 2-methylpentene-1 and 2-methylpentene-2, respectively, as the feedstocks. The operating conditions and results are shown below in table V, compared with equilibrium data.

TABLE V

Experimental Data, Examples 3 and 4

| Operating Conditions | Ex. 3 | (Equil.) | Ex. 4 |
|---|---|---|---|
| Temperature, °F. | 850 | 850 | 850 |
| Pressure, p.s.i.a. | 14.7 | 14.7 | 14.7 |
| Residence time, seconds | 3.3 | — | 3.3 |
| Effluent Analysis, Mol % | | | |
| 4-Methylpentene-1 | 1.9 | 1.8 | 2.0 |
| 4-Methylpentene-2 | 5.6 | 20.9 | 8.2 |
| 2-Methylpentene-2 | 56.7 | 42.3 | 63.7 |
| 2-Methylpentene-1 | 35.9 | 34.9 | 26.1 |

Note that the 4-methylpentene-1 which is produced in each case is substantially the same as at equilibrium. Thus, it is seen that the feedstock must be 4-methylpentene-2 if the production of 4-methylpentene-1 is to be substantially increased.

By reference to table IV, it is seen that the present invention provides a selectivity to 4-methylpentene-1 which is markedly superior to that obtained at thermal equilibrium or by charging the 2-methylpentenes. The production of 4-methylpentene-1 in a single-pass process probably will not be economically attractive, but the increasing selectivity at lower conversion levels allows an optimization by trading off conversion per pass against selectivity and increasing the recycle ratio to compensate for lower conversion levels.

Having disclosed our invention, we claim:

1. A vapor phase process for isomerizing 4-methylpentene-2 to obtain 4-methylpentene-1 which comprises:
   contacting a feed consisting essentially of 4-methylpentene-2 in the vapor phase under isomerizing conditions
   with a catalyst comprising an alkali metal hydroxide supported on an alumina,
   under conditions including a temperature from about 600° F. to about 1,200° F. and a residence time from about 0.1 second to about 10 seconds.

2. A process in accordance with claim 1 wherein the catalyst is potassium hydroxide on alcoholate alumina.

3. A process in accordance with claim 2 wherein the catalyst contains from 0.5 weight percent to 1.5 weight percent of potassium hydroxide, based on the weight of the alcoholate alumina.

4. A process for isomerizing 4-methylpentene-2 to obtain 4-methylpentene-1 which comprises:
   contacting a feed consisting essentially of 4-methylpentene-2 in the vapor phase with a catalyst comprising an alkali metal hydroxide supported on alcoholate alumina,
   under isomerization conditions including
   a temperature from 800° to 950° F.,
   a pressure from 0.1 to 10 atm., and
   a residence time from 0.1 to 10 seconds, and separating the resulting 4-methylpentene-1 from the reaction products.

5. A process in accordance with claim 4 wherein the catalyst is potassium hydroxide on alcoholate alumina.

6. A process in accordance with claim 4 wherein the catalyst is 1.5 weight percent potassium hydroxide on alcoholate alumina.

7. A process in accordance with claim 6 wherein the residence time is from about 3 to about 5 seconds.

8. A process in accordance with claim 7 wherein the isomerizing conditions are
   a temperature of 800° to 850° F. and
   a pressure of about atmospheric.